United States Patent
Cheng et al.

(10) Patent No.: US 8,095,650 B1
(45) Date of Patent: Jan. 10, 2012

(54) METHODS AND APPARATUS FOR REAL USER MONITORING INCLUDING FLASH MONITORING

(75) Inventors: Yuan Cheng, Needham, MA (US);
Allen Lieberman, Natick, MA (US);
Paul Anastas, Needham, MA (US);
Imad Mouline, Braintree, MA (US);
William Ryan Breen, Melrose, MA (US)

(73) Assignee: Compuware Corporation, Detroit, MI (US)

( * ) Notice: Subject to any disclaimer, the term of this patent is extended or adjusted under 35 U.S.C. 154(b) by 522 days.

(21) Appl. No.: 12/182,513

(22) Filed: Jul. 30, 2008

Related U.S. Application Data

(60) Provisional application No. 60/952,781, filed on Jul. 30, 2007.

(51) Int. Cl.
G06F 15/173 (2006.01)
G06F 15/16 (2006.01)

(52) U.S. Cl. .................................. 709/224; 709/203

(58) Field of Classification Search .............. 709/224, 709/203
See application file for complete search history.

(56) References Cited

U.S. PATENT DOCUMENTS

| | | | |
|---|---|---|---|
| 5,819,092 A | 10/1998 | Ferguson et al. | |
| 6,006,260 A | 12/1999 | Barrick et al. | |
| 6,304,904 B1 | 10/2001 | Sathyanarayan et al. | |
| 6,449,739 B1 | 9/2002 | Landan | |
| 6,473,794 B1 | 10/2002 | Guheen et al. | |
| 6,601,100 B2 | 7/2003 | Lee et al. | |
| 6,664,978 B1 | 12/2003 | Kekic et al. | |
| 6,697,969 B1 | 2/2004 | Merriam | |
| 6,704,732 B1 | 3/2004 | Barclay | |
| 6,763,386 B2 * | 7/2004 | Davis et al. | 709/224 |
| 6,801,940 B1 | 10/2004 | Moran et al. | |
| 6,810,494 B2 | 10/2004 | Weinberg et al. | |
| 6,886,132 B1 | 4/2005 | Hall et al. | |
| 6,892,238 B2 | 5/2005 | Lee et al. | |
| 6,895,437 B1 | 5/2005 | Cowdrey et al. | |
| 6,973,490 B1 | 12/2005 | Robertson et al. | |
| 7,003,565 B2 | 2/2006 | Hind et al. | |
| 7,034,835 B2 | 4/2006 | Whatmough | |
| 7,051,098 B2 * | 5/2006 | Masters et al. | 709/224 |
| 7,069,177 B2 | 6/2006 | Carley | |
| 7,076,495 B2 | 7/2006 | Dutta et al. | |
| 7,107,535 B2 | 9/2006 | Cohen et al. | |
| 7,231,442 B2 | 6/2007 | Chen | |
| 7,353,272 B2 | 4/2008 | Robertson et al. | |
| 7,355,996 B2 | 4/2008 | Hrastar | |
| 7,373,376 B1 | 5/2008 | Hamer et al. | |

(Continued)

OTHER PUBLICATIONS

"Document Object Model," Wikipedia, Aug. 1, 2007, pp. 1-4, [online] [retrieved on Aug. 7, 2007] retrieved from the internet <URL:http://en.wikipedia.org/wiki/Document_object_model>.

(Continued)

*Primary Examiner* — Minh-Chau Nguyen
(74) *Attorney, Agent, or Firm* — Fenwick & West LLP

(57) ABSTRACT

A system provides a tag for a flash application. The tag identifies a flash event to record during execution of the flash application. The flash event is recorded to monitor performance of the flash application to generate performance metrics. The flash performance monitoring process generates the performance metrics of the flash application based on an occurrence of the flash event during the execution of the flash application, and provides a graphical user interface in which to render a graphical representation of the generated performance metrics.

15 Claims, 12 Drawing Sheets

U.S. PATENT DOCUMENTS

| | | | |
|---|---|---|---|
| 7,389,330 | B2 | 6/2008 | Dillon et al. |
| 7,392,321 | B1 | 6/2008 | Wolf et al. |
| 7,437,451 | B2 | 10/2008 | Tang et al. |
| 7,447,671 | B2 | 11/2008 | Schoenfeld et al. |
| 7,526,546 | B2 | 4/2009 | Motoyama et al. |
| 7,532,895 | B2 | 5/2009 | Hrastar |
| 7,552,212 | B2 | 6/2009 | Chagoly et al. |
| 7,558,795 | B2 * | 7/2009 | Malik et al. .............................. 1/1 |
| 7,574,489 | B2 | 8/2009 | Motoyama et al. |
| 7,600,014 | B2 | 10/2009 | Russell et al. |
| 2001/0010059 | A1 | 7/2001 | Burman et al. |
| 2002/0099818 | A1 | 7/2002 | Russell et al. |
| 2002/0174214 | A1 | 11/2002 | Carl et al. |
| 2003/0005044 | A1 | 1/2003 | Miller et al. |
| 2003/0023712 | A1 | 1/2003 | Zhao et al. |
| 2003/0023715 | A1 | 1/2003 | Reiner et al. |
| 2003/0046029 | A1 | 3/2003 | Wiener et al. |
| 2003/0046383 | A1 | 3/2003 | Lee et al. |
| 2003/0046385 | A1 * | 3/2003 | Vincent ........................ 709/224 |
| 2003/0065763 | A1 | 4/2003 | Swildens et al. |
| 2003/0208593 | A1 | 11/2003 | Bharati et al. |
| 2003/0221000 | A1 | 11/2003 | Cherkasova et al. |
| 2003/0229677 | A1 | 12/2003 | Allan |
| 2003/0229900 | A1 | 12/2003 | Reisman |
| 2004/0031058 | A1 | 2/2004 | Reisman |
| 2004/0073644 | A1 | 4/2004 | Koch et al. |
| 2004/0110490 | A1 | 6/2004 | Steele et al. |
| 2004/0160445 | A1 | 8/2004 | Whatmough |
| 2004/0167749 | A1 | 8/2004 | Friedman et al. |
| 2004/0260807 | A1 | 12/2004 | Glommen et al. |
| 2005/0027858 | A1 | 2/2005 | Sloth et al. |
| 2005/0086587 | A1 | 4/2005 | Balz |
| 2005/0108391 | A1 | 5/2005 | Boss et al. |
| 2005/0223285 | A1 | 10/2005 | Faihe et al. |
| 2006/0085420 | A1 | 4/2006 | Hwang |
| 2007/0174419 | A1 | 7/2007 | O'Connell et al. |
| 2007/0250618 | A1 * | 10/2007 | Hammond .................... 709/224 |
| 2008/0086454 | A1 * | 4/2008 | Bahadori et al. .................. 707/3 |
| 2008/0288827 | A1 | 11/2008 | Chagoly et al. |
| 2009/0228572 | A1 * | 9/2009 | Wall et al. ..................... 709/218 |
| 2010/0095208 | A1 * | 4/2010 | White et al. .................. 715/704 |

OTHER PUBLICATIONS

Palme, J., et al., "MIME Encapsulation of Aggregate Documents, such as HTML (MHTML)," Mar. 1999, pp. 1-25.

Sigurdsson, K., et al., "Heritrix User Manual," May 24, 2004, pp. 1-46.

Whitmer, R., et al., "Document Object Model (DaM) Level 3 XPath Specification," published on the web by W3C.org, Feb. 26, 2004, pp. 1-32, [online] [retrieved on Aug. 7, 2007] retrieved from the internet <URL:http://www.w3.org/TR/2004/NOTE-DOM-Level-3-XPath-20040226/DOM3-XPath.html>.

International Search Report mailed Sep. 8, 2008 in counterpart International Application No. PCT/US07/82387, 7 pages.

Supplementary European Search Report, European Patent Application No. EP 07854385.7, Dec. 4, 2009, 8 pages.

* cited by examiner

203 PROVIDE A TAG FOR A FLASH APPLICATION, THE TAG IDENTIFYING A FLASH EVENT TO RECORD DURING EXECUTION OF THE FLASH APPLICATION, THE FLASH EVENT RECORDED TO MONITOR PERFORMANCE OF THE FLASH APPLICATION TO GENERATE PERFORMANCE METRICS

204 MINIMIZE AN IMPACT OF THE TAG ON AN EFFICIENCY OF THE EXECUTION OF THE FLASH APPLICATION

OR

205 ASSOCIATE THE TAG WITH THE FLASH APPLICATION DURING DEVELOPMENT OF THE FLASH APPLICATION

OR

206 AUTOMATICALLY, ACCORDING TO A PREDETERMINED DEFAULT SET OF OPERATIONS, RECORD AND TRANSMIT THE FLASH EVENT TO A PERFORMANCE SERVER

*FIG. 6*

207 PROVIDE A TAG FOR A FLASH APPLICATION, THE TAG IDENTIFYING A FLASH EVENT TO RECORD DURING EXECUTION OF THE FLASH APPLICATION, THE FLASH EVENT RECORDED TO MONITOR PERFORMANCE OF THE FLASH APPLICATION TO GENERATE PERFORMANCE METRICS

208 PROVIDE A CAPABILITY FOR A USER TO SPECIFY THE FLASH EVENT TO RECORD DURING THE EXECUTION OF THE FLASH APPLICATION

209 PROVIDE A CAPABILITY FOR A USER TO DEFINE THE FLASH EVENT

210 PROVIDE A CAPABILITY FOR A USER TO DEFINE A BEGINNING AND AN END FOR THE FLASH EVENT

*FIG. 7*

211 PROVIDE A TAG FOR A FLASH APPLICATION, THE TAG IDENTIFYING A FLASH EVENT TO RECORD DURING EXECUTION OF THE FLASH APPLICATION, THE FLASH EVENT RECORDED TO MONITOR PERFORMANCE OF THE FLASH APPLICATION TO GENERATE PERFORMANCE METRICS

212 PROVIDE A CAPABILITY FOR A USER TO SPECIFY THE FLASH EVENT TO TRANSMIT TO A PERFORMANCE SERVER

OR

213 DETECT A FLASH EVENT THRESHOLD ASSOCIATED WITH THE TAG

214 DETERMINE THE FLASH EVENT THRESHOLD HAS BEEN ACHIEVED DURING THE EXECUTION OF THE FLASH APPLICATION

215 TRANSMIT THE FLASH EVENT, ASSOCIATED WITH THE FLASH EVENT THRESHOLD, TO A PERFORMANCE SERVER

*FIG. 8*

216 PROVIDE A TAG FOR A FLASH APPLICATION, THE TAG IDENTIFYING A FLASH EVENT TO RECORD DURING EXECUTION OF THE FLASH APPLICATION, THE FLASH EVENT RECORDED TO MONITOR PERFORMANCE OF THE FLASH APPLICATION TO GENERATE PERFORMANCE METRICS

217 CONFIGURE THE TAG TO RECORD THE FLASH EVENT BY DEFAULT

↓

218 PROVIDE A USER WITH AN OPTION NOT TO RECORD THE FLASH EVENT

OR

219 PROVIDE A CAPABILITY FOR A USER TO SPECIFY A TYPE OF DATA, ASSOCIATED WITH THE FLASH EVENT, TO RETURN TO A PERFORMANCE SERVER

↓

220 SPECIFY THE TYPE OF DATA AS AT LEAST ONE OF:
i) EVENT DATA INCLUDING FLASH EVENTS DEFINED BY A USER
ii) ERROR DATA INCLUDING ERROR MESSAGES THAT ARE GENERATED DURING EXECUTION OF THE FLASH APPLICATION
iii) DYNAMIC DATA INCLUDING DATA THAT IS GENERATED DURING EXECUTION OF THE FLASH APPLICATION
iv) STATIC DATA INCLUDING METADATA THAT IS ASSOCIATED WITH THE FLASH APPLICATION

*FIG. 9*

224 PROVIDE A GRAPHICAL USER INTERFACE IN WHICH TO RENDER A GRAPHICAL REPRESENTATION OF THE GENERATED PERFORMANCE METRICS

225 CALCULATE AN IMPACT OF THE PERFORMANCE OF THE FLASH APPLICATION, THE IMPACT TRIGGERING A CONTRACTUAL VIOLATION

OR

226 IDENTIFY A DEVICE ON WHICH A USER IS RENDERING THE FLASH APPLICATION

↓

227 IDENTIFY SPECIFICATIONS ASSOCIATED WITH THE DEVICE

↓

228 CALCULATE THE PERFORMANCE METRICS ACCORDING TO THE DEVICE AND THE SPECIFICATIONS ASSOCIATED WITH THE DEVICE

*FIG. 11*

229 PROVIDE A GRAPHICAL USER INTERFACE IN WHICH TO RENDER A GRAPHICAL REPRESENTATION OF THE GENERATED PERFORMANCE METRICS

230 IDENTIFY A PROVIDER OF THE FLASH APPLICATION, THE PROVIDER ALLOWING THE FLASH APPLICATION TO OPERATE ON THE WEB PAGE IN THE BROWSER

↓

231 CALCULATE THE PERFORMANCE METRICS ACCORDING TO THE PROVIDER

OR

232 IDENTIFY DEMOGRAPHICS ASSOCIATED WITH A PLURALITY OF USERS RENDERING THE FLASH APPLICATION

↓

233 CALCULATE THE PERFORMANCE METRICS BASED ON THE DEMOGRAPHICS

*FIG. 12*

METHODS AND APPARATUS FOR REAL USER MONITORING INCLUDING FLASH MONITORING

RELATED APPLICATIONS

This Patent Application claims priority to U.S. Provisional Patent Application No. 60/952,781 filed on Jul. 30, 2007 entitled, "METHODS AND APPARATUS FOR REAL USER MONITORING INCLUDING FLASH MONITORING", the contents and teachings of which are hereby incorporated by reference in their entirety. This Provisional Patent Application is related to and hereby incorporated by reference U.S. Provisional application for patent having U.S. Ser. No. 60/854,379, filed in the United States Patent Office on Oct. 25, 2006 entitled "SYSTEMS, METHODS AND APPARATUS FOR REAL USER MONITORING" and U.S. Utility Application for Patent having U.S. Ser. No. 11/751,925. filed in the United States Patent Office on May 22, 2007 entitled "METHODS AND APPARATUS PROVIDING ANALYTICS OF WEB SITE PERFORMANCE", the contents and teachings of which are hereby incorporated by reference in their entirety.

BACKGROUND

Computer systems coupled to a data communications network, such as the Internet, allow for the exchange of a wide variety of information between users of such computer systems. One popular use of computer networks, such as the Internet, allows users to operate client communications software, known as a web browser, to communicate with remote computer systems, known as web servers, in order to browse web pages on the World Wide Web. The World Wide Web is generally a collection of web server computer systems such that each operate web server software that communicates using a number of different data communications protocols and data formats, to allow each user's browser to make web page requests to the web servers. In response to these web page requests, web servers obtain (e.g., from storage, or via dynamic generation) the requested web pages and serve those pages back to each user's web browser for viewing by the user.

A typical web page is written in a markup language, such as the Hypertext Markup Language (HTML), and includes a number of embedded objects referenced by respective Uniform Resource Locators (URLs) within the HTML of a web page. The web page itself is generally referenced by a URL, as well. When a user provides a URL to a web browser of a web page (either by clicking a hyperlink identifying the URL to that web page, or by typing in the URL of the web page), the web browser performs a detailed sequence of processing tasks to obtain that web page. As an example, if the URL of the web page identifies a domain name of a server computer system on the Internet, the web browser must first perform a Domain Name Service (DNS) lookup of the domain name to resolve this alphanumeric name into the Internet Protocol (IP) address of the web server on the Internet that can serve the web page referenced by the URL. Once this DNS lookup is complete, the web browser establishes a connection to the web server (e.g., a Transmission Control Protocol or TCP connection) and uses a Hypertext Transport Protocol (HTTP) to transmit a web page GET request over the connection to the web server. The HTTP GET request contains the URL of the web page to be served by the server. The web server receives this HTTP GET request, obtains or dynamically generates the web page, and returns the web page as HTML to the web browser in an HTTP response message over the connection.

As the web browser receives the HTML for the web page, the HTML of the web page may include many embedded URL's that define other objects within the web page to be obtained by web browser. As an example, a graphic, image, flash application, etc. embedded within the web page is typically referenced with an embedded URL that specifies a server, and location (i.e., filename and directory path) within the server of that graphic or image. As the web browser encounters objects such as embedded URL's within the web page, the web browser repeats the sequence of processing described above the URL for the web page in order to obtain each embedded object, this can include performing a DNS lookup of the domain name specified in the URL (if that domain name was not previously resolved), establishing a connection to a server, and initiating an HTTP get request to obtain the content associated with the embedded URL. Modern web pages often contain many embedded objects, and URLs, that reference these objects, often specify different server computer systems from which to obtain these objects. As a result, the process of obtaining the complete content associated with a single web page including all embedded objects involves significant processing and communications activities.

Sophisticated web server software systems allow a user to visit the web site using his or her browser in order to perform transactions within the web site such as purchasing goods or services, or viewing so called flash applications using, for example, a rich media player. Flash applications provide an enhanced user experience because animation and/or videos can be rendered on a web page. Depending upon the purpose of the web site, the flash application may execute automatically when a user requests a web page, or a user may initiate execution of a flash application. Execution of flash applications on web pages can enhance the user experience on the web site. Web site owners are also interested in the impact (i.e., business, financial, etc.) that the execution of flash applications have on the overall success of the web site. Flash applications typically consume more computer resources than conventional web pages. Accordingly, it is desirable to identify performance demands of flash applications. Because of this, web site owners have a vested interest in the performance of flash applications on web pages.

SUMMARY

Conventional technologies for monitoring and measuring the performance of flash applications suffer from a variety of deficiencies. In particular, conventional technologies for monitoring and measuring the performance of flash applications are limited in that conventional technologies do not run applications from the end user's vantage point (for example, in a browser, as a stand alone application, embedded in another software application, etc.), and accurately capture the end user's experience. Conventional technologies do not gauge performance of the flash application. Conventional technologies provide very little insight into the end user's actions and the overall end user experience. Conventional technologies do not validate $3^{rd}$ party services (for example, web hosting providers), and measure how the performance of those services contribute to the overall performance of the flash application, for example, operating on a web page. Web site owners need to know which users (i.e., visitors browsing the web site) are having trouble interacting with the flash applications on the web site, and specifically, what those problems are. For example, web site owners need to know if the problems are isolated in a certain geographical area, if the problems are tied to a specific operating system, etc. Failure to diagnose and correct the problems that users encounter operating flash applications on the web site ultimately impacts a user's overall experience with the web site.

Embodiments disclosed herein significantly overcome these and other deficiencies and provide a flash performance monitoring process that monitors flash applications from the end user experience, for example, at or within the user's browser, and provides an accurate perspective of the end user's web experience, thus minimizing the likelihood of poorly performing flash applications. That is, the flash performance monitoring process is, in one configuration, software code (or a computer configured to operate, or operating such code) that is embedded into the flash applications during development of the flash application. During development of the flash application, tags are inserted into the source code to monitor execution of flash events within the flash application. When a user downloads a web page containing the flash application, the tags (associated with the flash events) record the flash events during the execution of the flash application. The flash events are recorded to monitor performance of the flash application. Performance metrics are generated from the occurrence of the flash event, and the flash performance monitoring process provides a graphical user interface in which to render a graphical representation of the generated performance metrics. Insertion of the tags into the flash application does not impact the efficiency of the downloading and/or execution of the flash application on the web page.

In an example embodiment, the flash performance monitoring process identifies default flash events to record. The flash performance monitoring process automatically records these flash events and transmits the flash events to a performance server. A user may choose which default flash events are transmitted to the performance server. In another example embodiment, a user, during development of the flash application, may define the flash event (including defining a beginning and end to a flash event). The user may also choose which flash events to transmit to the performance server. The user may specify which data and what type of data, associated with a flash event, to transmit to the performance server.

In an example embodiment, a user may specify a flash event threshold. Once the flash event threshold has been reached during execution of the flash application, the flash event associated with the flash event threshold is transmitted to the performance server.

In an example embodiment, the flash performance monitoring process captures the experience of the user during execution of the flash application, including the actions of the user, for example, if the user exited the web page prior to the completion of the flash application. The flash performance monitoring process also captures the amount of traffic directed to the flash application operating on the web page.

In an example embodiment, the flash performance monitoring process identifies devices (i.e., laptops, PDAs, cell phones, etc.) used to access the flash application, including specifications associated with those devices (i.e., operating systems, etc.), and incorporates this data into the performance metrics. The flash performance monitoring process may also identify demographics associated with users of the flash application, presenting this information along with the performance metrics. This allows an owner of a web page (on which the flash application is operating) to identify user experience based on demographic areas. The flash performance monitoring process also provides performance metrics associated with $3^{rd}$ party service providers to validate the services provided.

Configurations disclosed herein also include a computer system executing a flash performance monitoring process that provides a tag for a flash application. The tag identifies a flash event to record during execution of the flash application. The flash event is recorded to monitor performance of the flash application to generate performance metrics. The flash performance monitoring process generates the performance metrics of the flash application based on an occurrence of the flash event during the execution of the flash application, and provides a graphical user interface in which to render a graphical representation of the generated performance metrics.

During an example operation of one embodiment, suppose a web site owner desires to have performance tracking for a flash application on a web page. During development of the flash application, tags are inserted into the flash application. A tag is associated with each flash event that is to be recorded during execution of the flash application. The flash performance monitoring process tracks default flash events, but the developer can also define custom flash events. When defining custom flash events, the developer may also specify the beginning and end of the flash event.

During execution of the flash application (i.e., when a user navigates to the web page containing the flash application and the flash application is either automatically rendered as the web page downloads, or the flash application is invoked by an action on the part of the user), the flash performance monitoring process records the flash events associated with tags. The recorded flash events are transmitted to a performance server where the performance metrics are generated. In an example embodiment, the developer may specify a number of times the flash event must occur before the performance metrics are generated. The developer may also specify which flash events are transmitted to the performance server.

Once the performance metrics are generated, the web site owner may view a graphical representation of the performance metrics rendered in a graphical user interface. The web site owner may specify how and which performance metrics are graphically represented. For example, the web site owner may specify a graphical representation of a specific flash event over a period of time determined by the web site owner.

Other embodiments disclosed herein include any type of computerized device, workstation, handheld or laptop computer, or the like configured with software and/or circuitry (e.g., a processor) to process any or all of the agent operations disclosed herein. In other words, a computerized device or a processor that is programmed or configured to operate in accordance with the system as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor and a communications interface, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

It is to be understood that the system disclosed herein can be embodied strictly as a software program, as software and hardware, or as hardware alone such as within a processor, or within an operating system or a within a software application and that the agent can execute in any type of computer system. Example embodiments disclosed herein may be implemented within products and/or software applications manufactured by Gomez, Inc. of Lexington, Mass., USA.

BRIEF DESCRIPTION OF THE DRAWINGS

The foregoing and other objects, features and advantages disclosed herein will be apparent from the following more particular description of embodiments disclosed herein, as illustrated in the accompanying drawings and figures in which like reference characters refer to the same parts throughout the different views. The drawings are not necessarily to scale, with emphasis instead being placed upon illustrating the embodiments, principles and concepts disclosed herein.

FIG. 6 illustrates a flowchart of a procedure performed by the system of FIG. 1 when the flash performance monitoring process provides a tag for a flash application, and minimizes an impact of the tag on an efficiency of the execution of the flash application, according to one embodiment disclosed herein.

FIG. 7 illustrates a flowchart of a procedure performed by the system of FIG. 1 when the flash performance monitoring process provides a tag for a flash application, and provides a capability for a user to specify the flash event to record during the execution of the flash application, according to one embodiment disclosed herein.

FIG. 8 illustrates a flowchart of a procedure performed by the system of FIG. 1 when the flash performance monitoring process provides a tag for a flash application, and provides a capability for a user to specify the flash event to transmit to a performance server, according to one embodiment disclosed herein.

FIG. 9 illustrates a flowchart of a procedure performed by the system of FIG. 1 when the flash performance monitoring process provides a tag for a flash application, and configures the tag to record the flash event by default, according to one embodiment disclosed herein.

FIG. 11 illustrates a flowchart of a procedure performed by the system of FIG. 1 when the flash performance monitoring process provides a graphical user interface in which to render a graphical representation of the generated performance metrics, according to one embodiment disclosed herein.

FIG. 12 illustrates a flowchart of a procedure performed by the system of FIG. 1 when the flash performance monitoring process provide a graphical user interface in which to render a graphical representation of the generated performance metrics, according to one embodiment disclosed herein.

DETAILED DESCRIPTION

Embodiments disclosed herein also include a computer system executing a flash performance monitoring process that provides a tag for a flash application. The tag identifies a flash event to record during execution of the flash application. The flash event is recorded to monitor performance of the flash application to generate performance metrics. The flash performance monitoring process generates the performance metrics of the flash application based on an occurrence of the flash event during the execution of the flash application, and provides a graphical user interface in which to render a graphical representation of the generated performance metrics.

Figure 1:
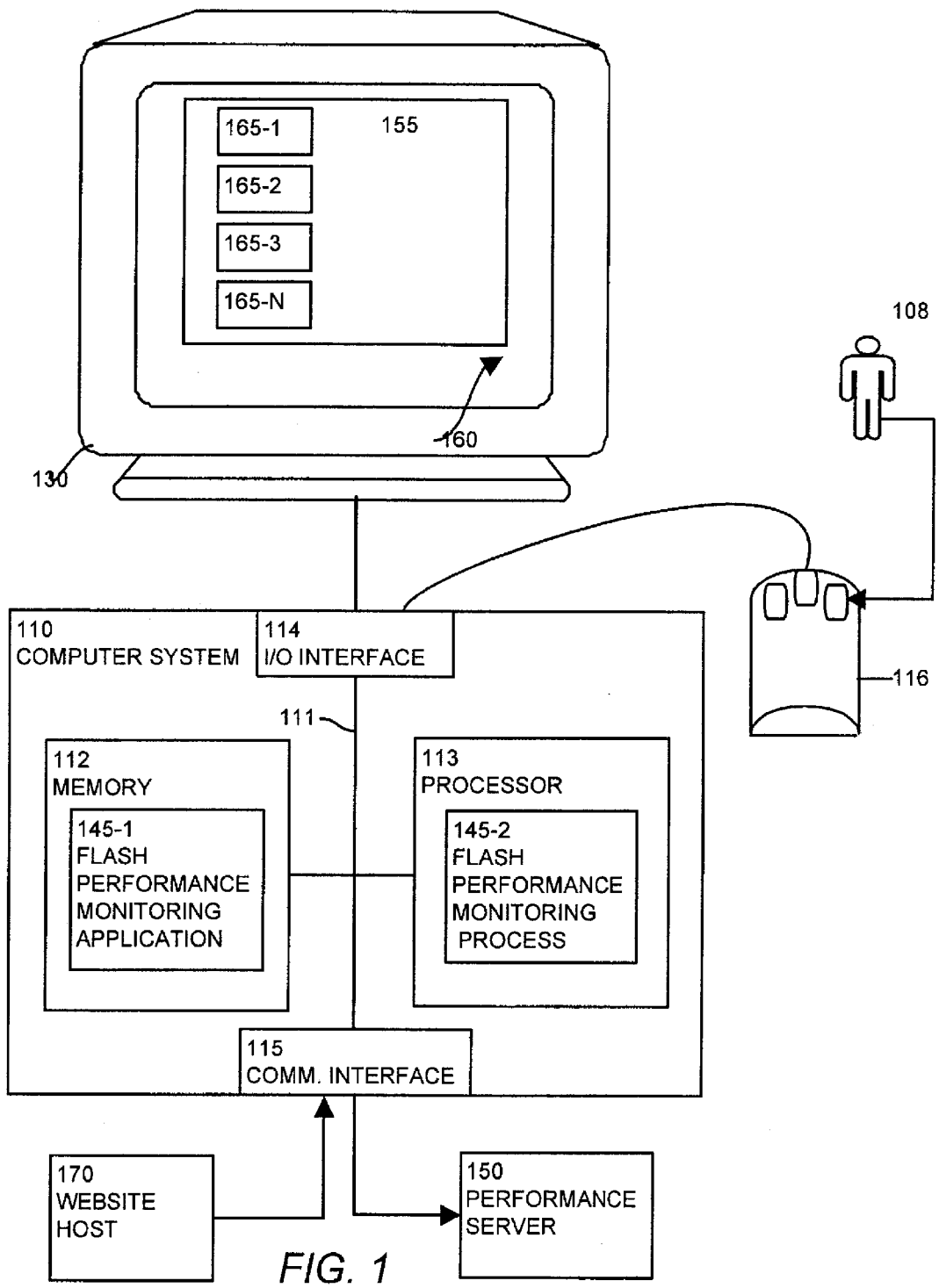
FIG. 1 shows a high-level block diagram of a computer system according to one embodiment disclosed herein.

FIG. 1 is a block diagram illustrating example architecture of a computer system 110 that executes, runs, interprets, operates or otherwise performs a flash performance monitoring application 145-1 and process 145-2. The computer system 110 may be any type of computerized device such as a personal computer, workstation, portable computing device, console, laptop, network terminal or the like. As shown in this example, the computer system 110 includes an interconnection mechanism 111 such as a data bus or other circuitry that couples a memory system 112, a processor 113, an input/output interface 114, and a communications interface 115. An input device 116 (e.g., one or more user/developer controlled devices such as a keyboard, mouse, etc.) couples to processor 113 through I/O interface 114, and enables a user 108 (i.e., a user executing the flash application 155) to provide input commands and generally control the graphical user interface 160 that the flash performance monitoring application 145-1 and process 145-2 provides on the display 130. The graphical user interface 160 displays the flash application 155. As the flash application 155 executes, the tags 165-1, 165-2, 165-3, and 165-N that were inserted into the flash application 155 during the development of the flash application 155, record flash events. The communications interface 115 enables the computer system 110 to communicate with other devices (i.e., other computers) on a network, (not shown). This can allow access to the flash performance monitoring application by remote computer systems and, in some embodiments, the flash application 155 may be rendered from a remote source via the communications interface 115. The communications interface 115 communicates with the performance server 150 (to which the flash events are transmitted), and the web site host 170 (from which the flash application 155, residing on a web page, is downloaded, to the user's 108 computer system 110).

The memory system 112 is any type of computer readable medium and, in this example, is encoded with a flash performance monitoring application 145-1. The flash performance monitoring application 145-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112, via the interconnect 111, in order to launch, run, execute, interpret or otherwise perform the logic instructions of the flash performance monitoring application 145-1. Execution of flash performance monitoring application 145-1 in this manner produces processing functionality in a flash performance monitoring process 145-2. In other words, the flash performance monitoring process 145-2 represents one or more portions of runtime instances of the flash performance monitoring application 145-1 (or the entire application 145-1) performing or executing within or upon the processor 113 in the computer system 110 at runtime.

It is noted that example configurations disclosed herein include the flash performance monitoring application 145-1. The flash performance monitoring application 145-1 may be stored on a computer readable medium (such as a floppy disk), hard disk, electronic, magnetic, and optical or other computer readable medium. The flash performance monitoring application 145-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the flash performance monitoring application 145-1 in the processor 113 as the flash performance monitoring process 145-2. Those skilled in the art will understand that the computer system 110 may include other processes and/or software and hardware components, such as an operating system not shown in this example.

A display 130 need not be coupled directly to computer system 110. For example, the flash performance monitoring application 145-1 can be executed on a remotely accessible computerized device via the network interface 115. In this instance, the graphical user interface 160 may be displayed locally to a user of the remote computer and execution of the processing herein may be client-server based.

Figure 2:
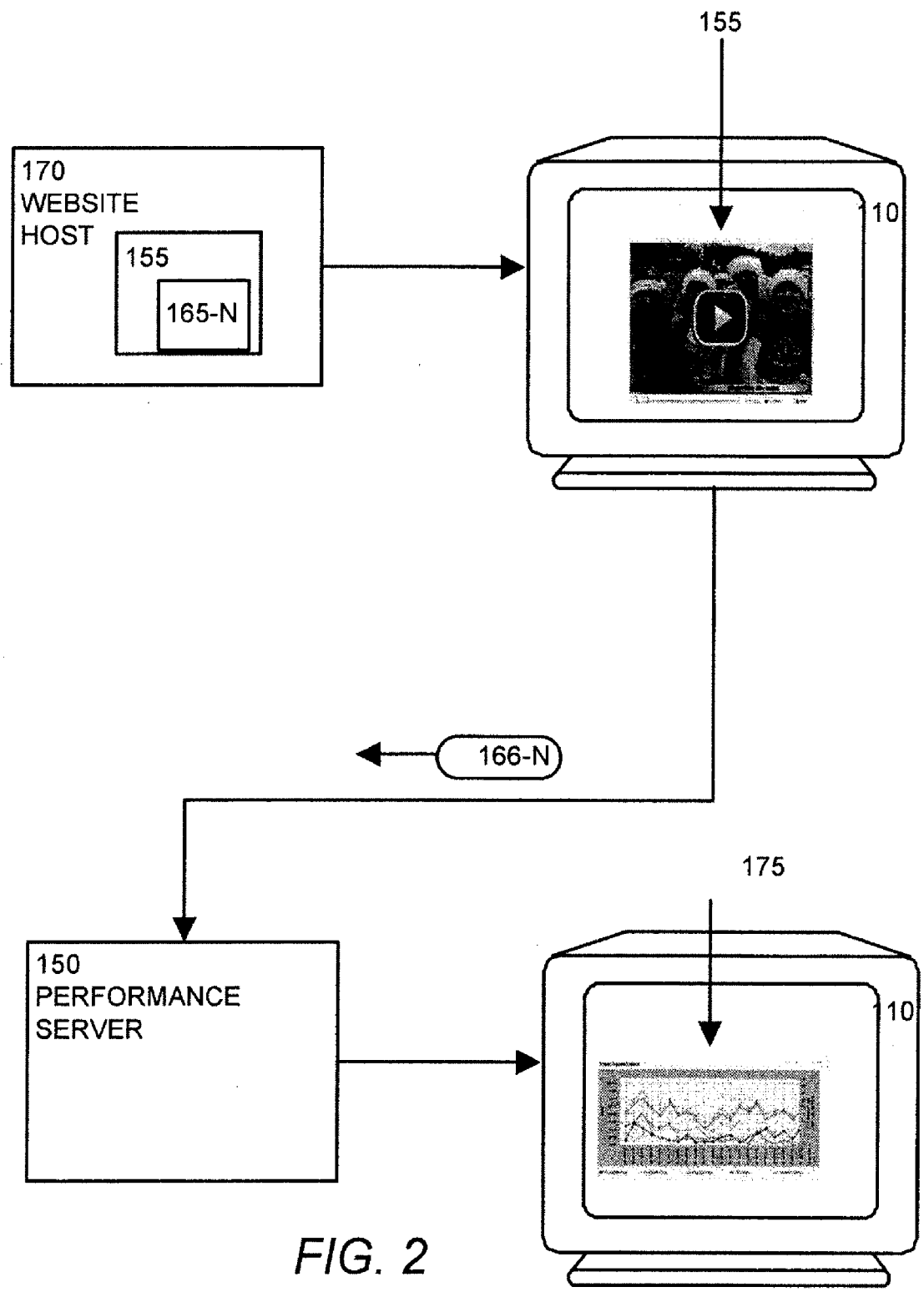
FIG. 2 illustrates an example system according to one embodiment disclosed herein.

FIG. 2 is an example embodiment of a system disclosed herein. During the development of a flash application 155, a developer inserts tags 165-N to record flash events 166-N. Once the development is completed, the developer transmits the flash application 155 to a web site host 170 for execution as an executing flash application 155. When a user 108 accesses the flash application 155 that resides on a web page, the flash application 155 is downloaded from the web site host 170 to a computer system 110 rendering the web page. As the flash application 155 executes, the tags 165-N record flash events 166-N. The flash events 166-N are transmitted to a performance server 150 (also operating on a computer system 110) where the performance metrics 175 are generated. The performance metrics 175 are rendered on a computer system 110.

Figure 3:
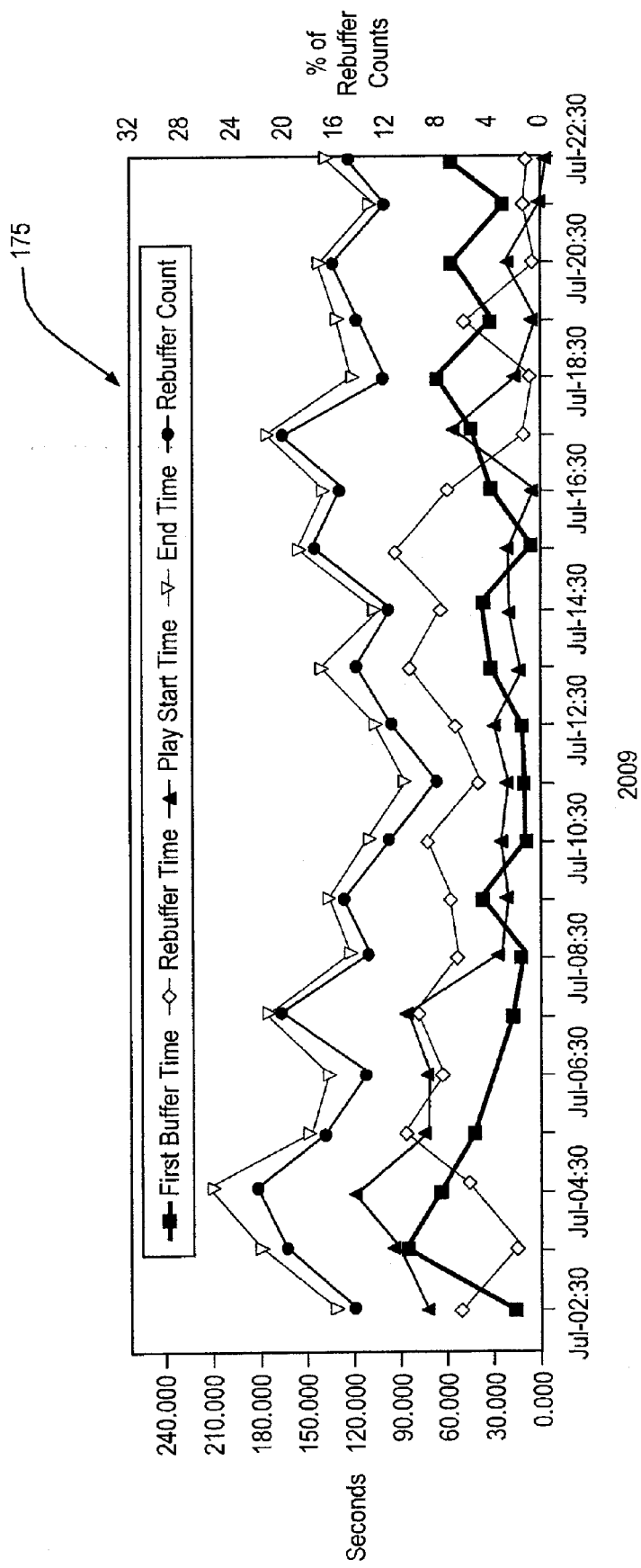
FIG. 3 is an example screen shot of performance metrics associated with a flash application.

FIG. 3 is a screen shot of the performance metrics 175. In this example, the flash performance monitoring process 145-2 has generated performance metrics 175. The performance metrics 175 depict the amount of time required to download a flash application 155 over a 24-hour period. This screenshot illustrates that level of detail concerning flash events 166-N that the flash performance monitoring process 145-2 affords.

Figure 4:
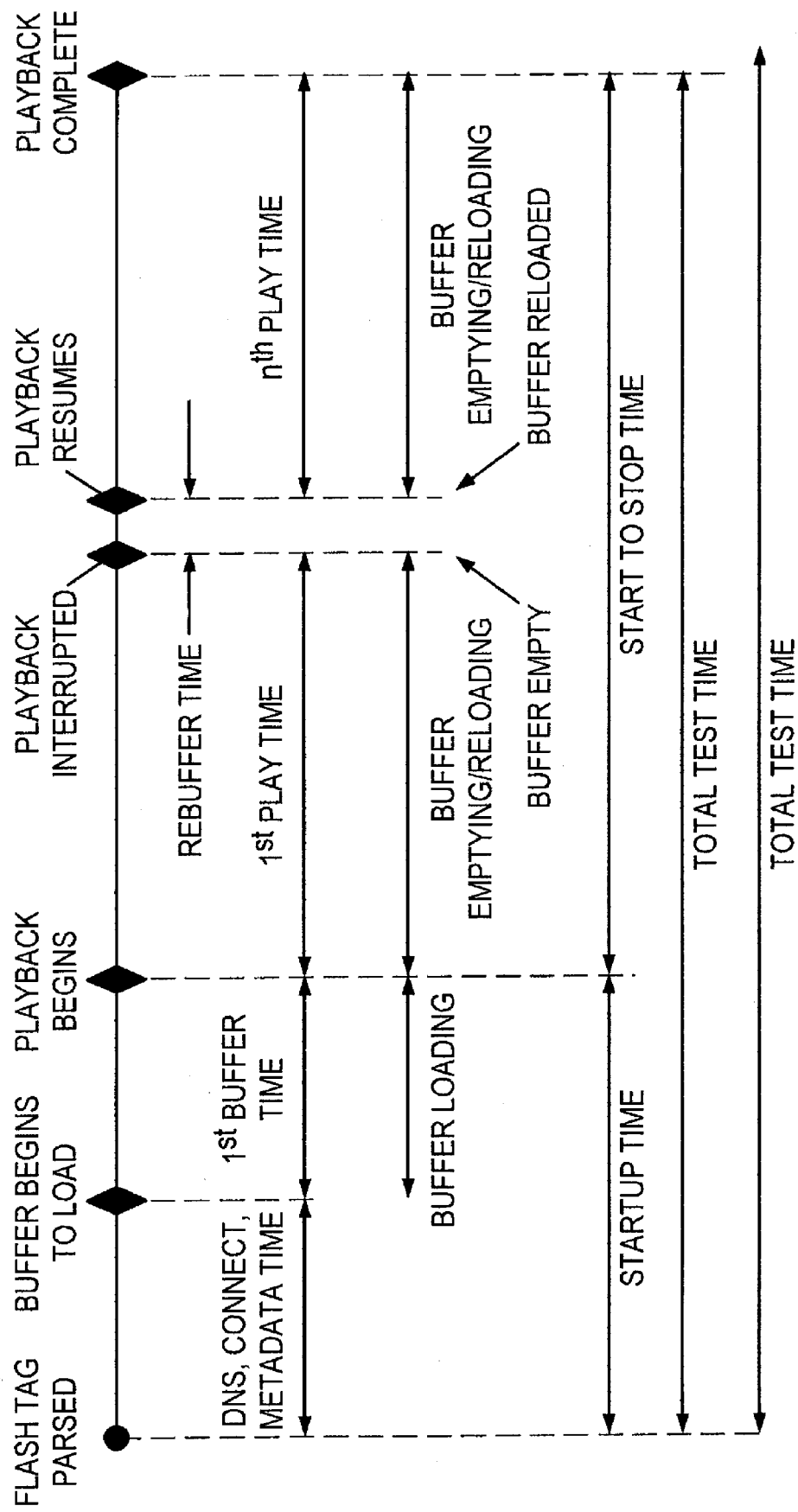
FIG. 4 is an example timeline of flash events captured during execution of a flash application.

FIG. 4 illustrates an example timeline of flash events 166-N captured during execution of a flash application. The timeline depicts the occurrence of Start-up Time, Start-to-Stop Time, First Buffer Time (or initial buffer time), Average Rebuffer Time, Average Play Time, and Rebuffer Count. These flash events 166-N are defined in step 201.

Further details of configurations explained herein will now be provided with respect to a flow chart of processing steps that show the high level operations disclosed herein. Unless otherwise stated, the steps described below are unordered meaning that, when possible, the steps can be performed in any convenient or desirable order.

Figure 5:
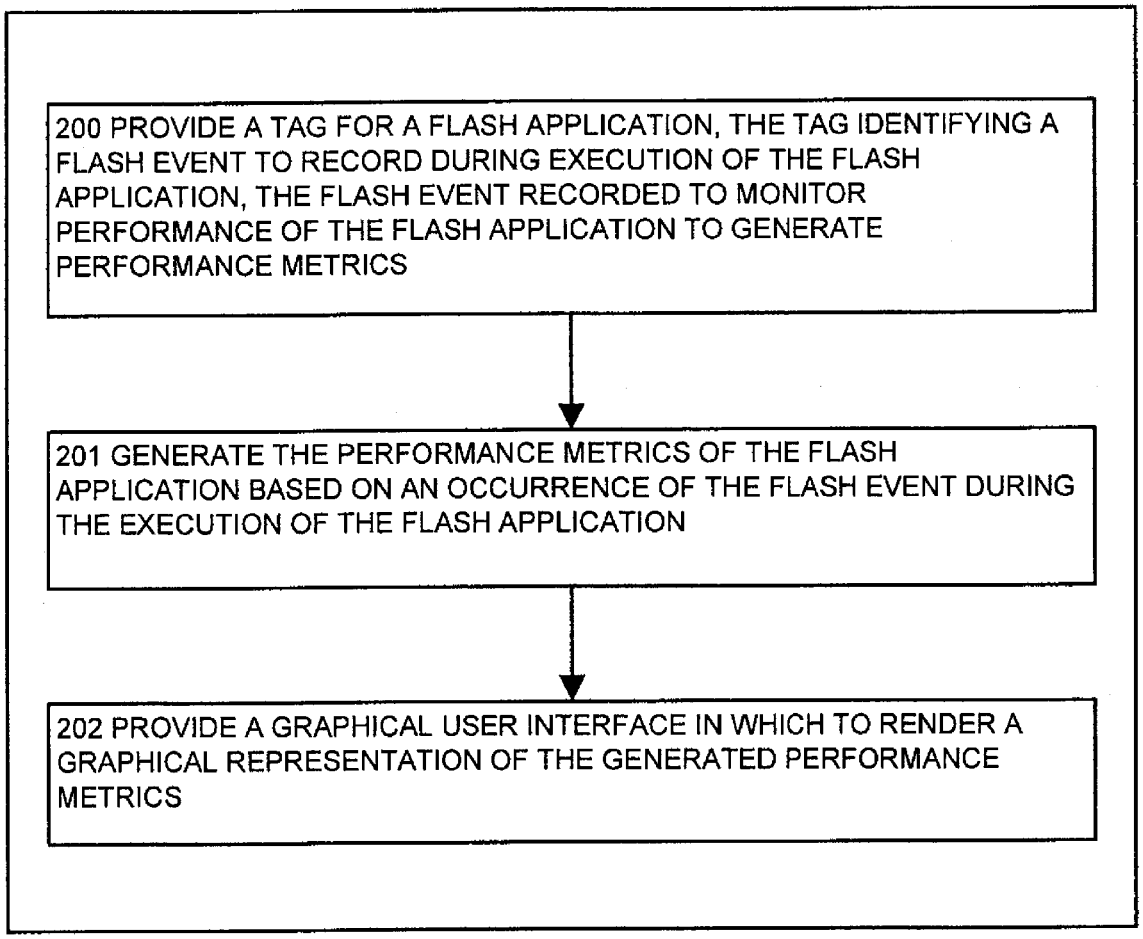
FIG. 5 illustrates a flowchart of a procedure performed by the system of FIG. 1 when the flash performance monitoring process provides a tag for a flash application, the tag identifying a flash event to record during execution of the flash application, the flash event recorded to monitor performance of the flash application to generate performance metrics, according to one embodiment disclosed herein.

FIG. 5 is a flowchart of the steps performed by the flash performance monitoring process 145-2 when it provides a tag 165-1 for a flash application 155.

In step 200, the flash performance monitoring process 145-2 provides a tag 165-1 for a flash application 155. The tag 165-1 identifies a flash event to record during execution of the flash application 155. The flash event is recorded to monitor performance of the flash application 155 to generate performance metrics 175. In an example embodiment, a developer adds the following code to a flash application 155 being developed:

var GZMonTag=GZMon.getSingleton( );
   GZMonTag.setParameter (account id, data, event count, boolean flag);
   flv_PlayBack.play("flv URL");
where account id=an account id
data=the type of data the tag will return. There are four types available: Static, Dynamic, Error, and Event. See step 220 for more information on the four data types available. event count=the cumulative number of Flash events 166-N (including custom events) that will trigger the sending of data. See steps 213 through 215 for more information on event count. boolen flag=this is optional parameter with default value of false. There are three tag modes. Tag mode 1 it means user 108 monitors NetStream event by itself, collects data and sends data all by itself. The flag can be set to false or left as a default in tag mode 1. In tag mode 2, the user 108 passes NetStream object to flash tag 165-1. The tag 165-1 monitors NetStream event and collects data. The tag 165-1 then sends the collected data. The flag should be set to true in tag mode 2. In tag mode 3, the user 108 collects data by itself and sends data using method SendDynamicObjectO. In tag mode 3, flag should be set as true.

In step 201, the flash performance monitoring process 145-2 generates the performance metrics 175 of the flash application 155 based on an occurrence of the flash event during the execution of the flash application 155. Performance metrics 175 include Start-up Time, Start-to-Stop Time, First Buffer Time, Average Rebuffer Time, Average Play Time, and Rebuffer Count. FIG. 4 illustrates the performance metrics 175 captured during execution of the flash application 155. Start-up Time is the time elapsed from the point at which the tag 165-1 is parsed to the point at which the buffer is fully loaded and playback begins. Start to Stop Time is the time elapsed from the beginning of playback to the end of playback. First Buffer Time is the time elapsed from the point at which the URL has been resolved, the connection made, and any metadata downloaded to the point at which the buffer is filled and playback begins. Average Rebuffer Time is the average length of playback interruptions caused by rebuffering. Average Play Time is the average length of uninterrupted playback sessions between rebuffering interruptions for a single viewing of the Flash content. Rebuffer Count is the number of rebuffering interruptions that occur during a single viewing of the Flash content.

In step 202, the flash performance monitoring process 145-2 provides a graphical user interface 160 in which to render a graphical representation of the generated performance metrics 175. FIG. 3 illustrates an example screen shot of the generated performance metrics 175.

FIG. 6 is a flowchart of the steps performed by the flash performance monitoring process 145-2 when it provides a tag 165-1 for a flash application 155.

In step 203, the flash performance monitoring process 145-2 provides a tag 165-1 for a flash application 155. The tag 165-1 identifies a flash event to record during execution of the flash application 155. The flash event is recorded to monitor performance of the flash application 155 to generate performance metrics 175.

In step 204, the flash performance monitoring process 145-2 minimizes an impact of the tag 165-1 on an efficiency of the execution of the flash application 155. The insertion of the tags 165-N into the flash application 155 does not cause any performance degradation during execution of the flash application 155. In other words, a user 108 will not notice a difference between a flash application 155 with tags 165-N inserted, and a flash application 155 without tags 165-N because the insertion of the tags 165-N does not slow down the downloading of the flash application 155 on the web page.

Alternatively, in step 205, the flash performance monitoring process 145-2 associates the tag 165-1 with the flash application 155 during development of the flash application 155. In an example embodiment, during development of the flash application 155, a developer inserts tags 165-N into the source code associated with the flash application 155. The developer may insert a tag 165-1 in the source code, for example, as close to the invocation of the flash event as possible, to associate the tag 165-1 with the flash event.

Alternatively, in step 206, the flash performance monitoring process 145-2 automatically, according to a predetermined default set of operations, records and transmits the flash event to a performance server 150. In an example embodiment, the flash performance monitoring process 145-2 automatically defines default flash events 166-N. The default flash events 166-N are recorded during execution of the flash application 155, and automatically transmitted to a performance server 150.

FIG. 7 is a flowchart of the steps performed by the flash performance monitoring process 145-2 when it provides a tag 165-1 for a flash application 155.

In step 207, the flash performance monitoring process 145-2 provides a tag 165-1 for a flash application 155. The tag 165-1 identifies a flash event to record during execution of the flash application 155. The flash event is recorded to monitor performance of the flash application 155 to generate performance metrics 175. The flash event may be a default flash event or a custom flash event.

In step 208, the flash performance monitoring process 145-2 provides a capability for a user 108 to specify the flash event to record during the execution of the flash application 155. In an example embodiment, a user 108 may configure the source code of the flash application 155 to record the flash events 166-N specified by the user 108. This may also include setting the Boolean flag (as explained in step 200) to indicate that the user 108 intends to specify the flash events 166-N to record.

In step 209, the flash performance monitoring process 145-2 provides a capability for a user 108 to define the flash event. A user 108 may specify what, within the source code of the flash application 155, is a flash event. Within the source code, the user 208 specifies a flash event by adding tag call in the source code, right before the flash event occurs:
_root.GZMonTag.nameEvent ('flash event name');
The user 108 may also define an event timer associated with the flash event. This event timer will record a timestamp when the flash event is invoked.

In step 210, the flash performance monitoring process 145-2 provides a capability for a user 108 to define a beginning and an end for the flash event. Once a user has defined a flash event, the user 108 may specify event timers. The interval timers specify a start point and an end point to the flash event, and are positioned in the source code at the locations where the flash event begins and ends. Example coding is listed below:
_root.GZMonTag.startInterval ('flash event name');
and
_root.GZMonTag.endInterval ('flash event name');

FIG. 8 is a flowchart of the steps performed by the flash performance monitoring process 145-2 when it provides a tag 165-1 for a flash application 155.

In step 211, the flash performance monitoring process 145-2 provides a tag 165-1 for a flash application 155. The tag 165-1 identifies a flash event to record during execution of the flash application 155. The flash event is recorded to monitor performance of the flash application 155 to generate performance metrics 175.

In step 212, the flash performance monitoring process 145-2 provides a capability for a user 108 to specify the flash event to transmit to a performance server 150. As detailed in step 200, a user 108 may specify which flash events 166-N to transmit to the performance server 150 based on a Boolean flag set setting parameters for recording flash events 166-N. An example is detailed below:
GZMonTag.setParameter (account id, data, event count, boolean flag);

Alternatively, in step 213, the flash performance monitoring process 145-2 detects a flash event threshold associated with the tag 165-1. When setting the parameters for recording flash events 166-N, a user 108 may specify a number of flash events 166-N (i.e., 'event count') that must occur before the details of those flash events 166-N are transmitted to the performance server 150:
GZMonTag.setParameter (account id, data, event count, boolean flag);

In step 214, the flash performance monitoring process 145-2 determines the flash event threshold has been achieved during the execution of the flash application 155. For example, a user 108 sets 'event count' to five when setting the flash event parameters. During execution, the flash performance monitoring process 145-2 records each time the flash event occurs. When the number of times the flash event occurs equals five, the flash performance monitoring process 145-2 determines that the flash event threshold has been met.

In step 215, the flash performance monitoring process 145-2 transmits the flash event, associated with the flash event threshold, to a performance server 150. Once the flash performance monitoring process 145-2 determines that the flash event threshold has been reached, the flash performance monitoring process 145-2 transmits the flash event details to the performance server 150.

FIG. 9 is a flowchart of the steps performed by the flash performance monitoring process 145-2 when it provides a tag 165-1 for a flash application 155.

In step 216, the flash performance monitoring process 145-2 provides a tag 165-1 for a flash application 155. The tag 165-1 identifies a flash event to record during execution of the flash application 155. The flash event is recorded to monitor performance of the flash application 155 to generate performance metrics 175

In step 217, the flash performance monitoring process 145-2 configures the tag 165-1 to record the flash event by default. In an example embodiment, a user 108 inserts the following code into the source code of the flash application 155, to record default flash events 166-N and transmit them to the performance server 150:
var GZMonTag=GZMon.getSingleton( );
GZMonTag.setParameter (account id, data, event count, boolean flag);

flv_PlayBack.play("flv URL");

In step 218, the flash performance monitoring process 145-2 provides a user 108 with an option not to record the flash event. The flash performance monitoring process 145-2 automatically records default flash events 166-N as detailed in FIG. 4. The user may modify the default code provided by the flash performance monitoring process 145-2, and comment out those default flash events 166-N that the user 108 may not wish to capture. For example, in the code provided below, the user 108 has chosen to comment out the lines of code that specify capture of the "paused" and "ready" default flash events 166-N:

```
private function fpbEvent (mc:FLVPlayback): Void {
if(ExternalInterface. available)
ExternalInterface.call("gomez.nameEvent","FLVPlay-
    back Start");
mc. addEventListener("buffering", create(this, onfbp-
    Buffer));
mc. addEventListener("complete", create(this, onfbp-
    Complete));
mc. addEventListener("playing", create(this, onfbpPlay));
mc. addEventListener("stopped", create(this, onfbp-
    Stop));
// mc.addEventListener("paused", create(this, onfbp-
    Pause));
mc. addEventListener("close", create(this, onfbpClosed));
// mc.addEventListener("ready", create(this, onfb-
    pReady));
mc.addEventListener("metadataReceived", create(this,
    onfbpFLVMetaData));
}
```

In step 219, the flash performance monitoring process 145-2 provides a capability for a user 108 to specify a type of data, associated with the flash event, to return to a performance server 150. In an example embodiment, as detailed in step 200, a user 108 may specify the type of data to record when setting the parameters for recording flash events 166-N. The type of data is the $2^{nd}$ parameter (labeled 'data') in the following line of code:

GZMonTag.setParameter (account id, data, event count, boolean flag);

In step 220, the flash performance monitoring process 145-2 specifies the type of data as at least one of:

i) event data including flash events 166-N defined by a developer.

ii) error data including error messages that are generated during execution of the flash application 155.

iii) dynamic data including data that is generated during execution of the flash application 155.

iv) static data including metadata that is associated with the flash application 155.

In an example embodiment, the data type field is specified (when specifying the flash event parameters) by a decimal representation of the binary number whose digits would identify which types of data to turn on or off—"1" to turn it on and "0" to turn it off. For example, to return all types of data except Error, the number 11 would be entered as the parameter. The binary equivalent of 11 is 1011, indicating Event data is on, Error data is off, Dynamic data is on, and Static data is on:

| 11 = 1011 = | 1 | 0 | 1 | 1 |
|---|---|---|---|---|
| | Event on | Error off | Dynamic on | Static on |

In another example embodiment, if the number 7 is entered as the parameter, only Error, Dynamic, and Static data will be returned:

| 7 = 0111 = | 0 | 1 | 1 | 1 |
|---|---|---|---|---|
| | Event off | Error on | Dynamic on | Static on |

Figure 10:
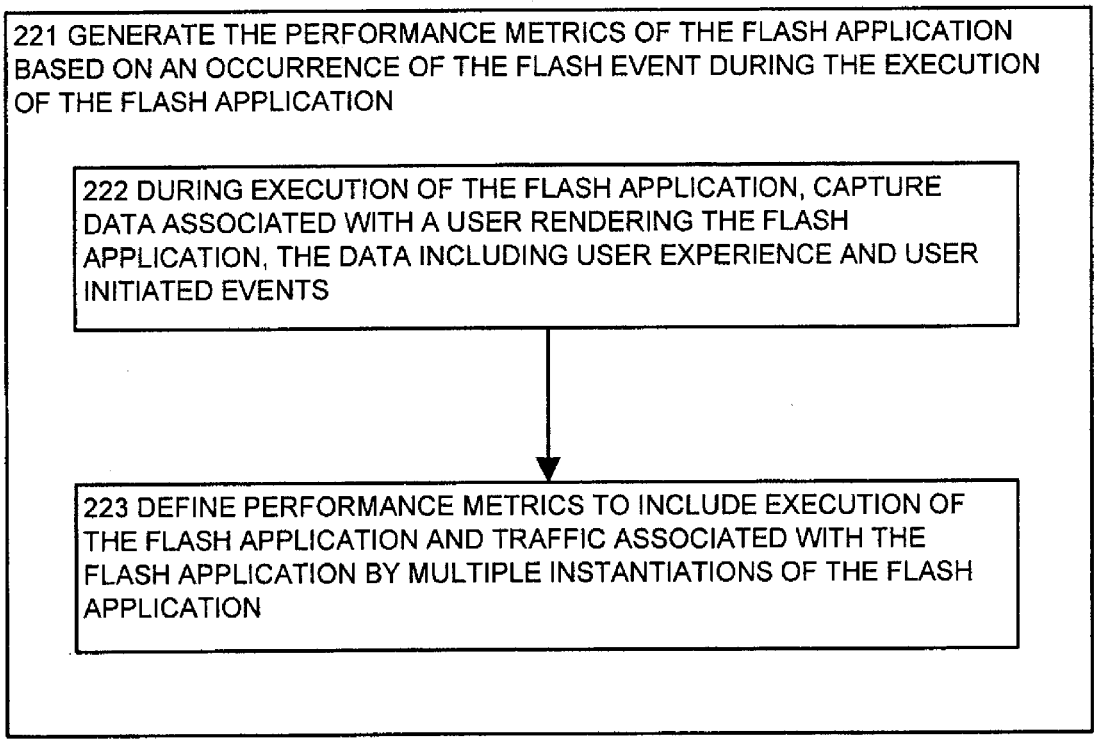
FIG. 10 illustrates a flowchart of a procedure performed by the system of FIG. 1 when the flash performance monitoring process generates the performance metrics of the flash application based on an occurrence of the flash event during the execution of the flash application, according to one embodiment disclosed herein.

FIG. 10 is a flowchart of the steps performed by the flash performance monitoring process 145-2 when it generates the performance metrics 175 of the flash application 155 based on an occurrence of the flash event during the execution of the flash application 155.

In step 221, the flash performance monitoring process 145-2 generates the performance metrics 175 of the flash application 155 based on an occurrence of the flash event during the execution of the flash application 155. During execution of the flash application 155, the flash performance monitoring process 145-2 is recording flash events 166-N, such as 'Start Up Time' and "First Buffer Time" (as explained in step 201). For example, if the flash application 155 takes too long to start up, this may impact the user 108 experience. If the flash application 155 experiences a very long first buffer time, this may indicate network issues.

In step 222, the flash performance monitoring process 145-2, during execution of the flash application 155, captures data associated with a user rendering the flash application 155, the data including user experience and user initiated events. User experience may include how long the flash application 155 took to load and/or execute. User initiated events may include whether the user 108 rendered the flash application 155 to completion, or whether the user 108 exited the web page on which the flash application 155 is rendered.

In step 223, the flash performance monitoring process 145-2 defines performance metrics 175 to include execution of the flash application 155, and traffic associated with the flash application 155 by multiple instantiations of the flash application 155. For example, traffic associated with the flash application 155 may include flash views (i.e., the number of time the flash application 155 was viewed over a period of time).

FIG. 11 is a flowchart of the steps performed by the flash performance monitoring process 145-2 when it provides the graphical user interface 160 in which to render the graphical representation of the generated performance metrics 175.

In step 224, the flash performance monitoring process 145-2 provides the graphical user interface 160 in which to render the graphical representation of the generated performance metrics 175. The graphical representation of the performance metrics 175 provides the web site owner with visibility into the performance of the flash application 155 when the flash application 155 is operating in the user's 108 browser.

In step 225, the flash performance monitoring process 145-2 calculates an impact of the performance of the flash application 155, the impact triggering a contractual violation. In an example embodiment, a web site owner has a Service Level Agreement (SLA) with a web-hosting provider. The SLA may include, for example, guaranteed up time for the web site. The performance metrics 175 may reveal that the SLA has been violated based on percentage of time the flash application 155 failed to execute due to network issues associated with the web-hosting provider.

Alternatively, in step 226, the flash performance monitoring process 145-2 identifies a device on which a user 108 is rendering the flash application 155. For example, the user 108 may render the flash application 155 on a laptop, PDA, cell phone, etc. The flash performance monitoring process 145-2 is capable of identifying the device by which the user 108 accessed the flash application 155.

In step 227, the flash performance monitoring process 145-2 identifies specifications associated with the device. In an example embodiment, the flash performance monitoring process 145-2 may identify the operating system of the device, a type of browser used to access the flash application 155, etc. This information may aid in determining why some users 108 have a lower visitor satisfaction experience than other users 108.

In step 228, the flash performance monitoring process 145-2 calculates the performance metrics 175 according to the device and the specifications associated with the device. In an example embodiment, the flash performance monitoring process 145-2 calculates the performance metrics 175 based on a variety of factors, such as device type, device specifications, etc. The graphical user interface 160 allows the web site owner to view and compare the performance metrics 175 based these factors.

FIG. 12 is a flowchart of the steps performed by the flash performance monitoring process 145-2 when it provides the graphical user interface 160 in which to render the graphical representation of the generated performance metrics.

In step 229, the flash performance monitoring process 145-2 provides the graphical user interface 160 in which to render the graphical representation of the generated performance metrics. The flash performance monitoring process 145-2 allows the web site owner to choose which factors of the performance metrics 175 are rendered within the graphical representation of the performance metrics 175.

In step 230, the flash performance monitoring process 145-2 identifies a provider of the flash application 155. The provider allows the flash application 155 to operate on the web page in the browser. For example, the flash performance monitoring process 145-2 may identify a web-hosting provider that hosts the web page on which the flash application 155 is rendered. The flash performance monitoring process 145-2 may also identify the means by which the user 108 connects to the Internet to render the flash application 155.

In step 231, the flash performance monitoring process 145-2 calculates the performance metrics 175 according to the provider. In an example embodiment, the flash performance monitoring process 145-2 provides a graphical representation of the performance metrics 175 associated with the provider, enabling the web site owner to assess the performance of the provider with respect to the rendering of the flash application 155.

Alternatively, in step 232, the flash performance monitoring process 145-2 identifies demographics associated with a plurality of users rendering the flash application 155. The flash performance monitoring process 145-2 may identify demographics such as the location from which a user 108 is accessing the flash application 155.

In step 233, the flash performance monitoring process 145-2 calculates the performance metrics 175 based on the demographics. In an example embodiment, the flash performance monitoring process 145-2 provides a graphical representation of the performance metrics 175 sorted according to the locations of the users 108 accessing the flash application 155.

While the system and method have been particularly shown and described with references to configurations thereof, it will be understood by those skilled in the art that various changes in form and details may be made therein without departing from the scope of embodiments disclosed herein encompassed by the appended claims. Accordingly, the present embodiments disclosed herein are not intended to be limited by the example configurations provided above.

What is claimed is:

1. A computer-implemented method for monitoring performance of a flash application, the method comprising:
    embedding a tag within the markup language of a web page, the tag identifying a flash event and an associated flash event threshold to record during execution of the flash application in conjunction with rendering the web page at a client, wherein the flash event and associated flash event threshold are recorded for monitoring performance of the flash application;
    transmitting from a server the web page including the embedded tag to the client responsive to a client request for the web page;
    in response to the flash event being recorded at the client, receiving at the server, flash event threshold information associated with the flash event;
    generating performance metrics for the flash application based on the received flash event information; and
    generating a graphical user interface displaying a graphical representation of the generated performance metrics.

2. The method of claim 1, wherein embedding the tag within the markup language of a web page comprises:
    providing a capability for a user to specify the flash event to record during the execution of the flash application.

3. The method of claim 2 wherein providing the capability for the user to specify the flash event to record during the execution of the flash application comprises:
    providing a capability for a user to define the flash event.

4. The method of claim 3, further comprising:
    providing a capability for the user to define a beginning and an end for the flash event.

5. The method of claim 1, wherein embedding the tag within the markup language of a web page further comprises:
    providing a capability for a user to specify a type of data, associated with the flash event, to return to the server.

6. The method of claim 5, further comprising specifying the type of data as at least one of:
    i) event data including flash events defined by the user;
    ii) error data including error messages that are generated during execution of the flash application;
    iii) dynamic data including data that is generated during execution of the flash application; and
    iv) static data including metadata that is associated with the flash application.

7. The method of claim 1, wherein embedding the tag within the markup language of a web page comprises:
    minimizing an impact of the tag on an efficiency of the execution of the flash application.

8. The method of claim 1, wherein embedding the tag within the markup language of a web page comprises:
    associating the tag with the flash application during development of the flash application.

9. The method of claim 1, wherein generating the performance metrics for the flash application based on the received flash event information comprises:
    capturing data associated with a user rendering the flash application, the data including user experience and user initiated events.

10. The method of claim 1 wherein generating the performance metrics comprises:
    defining performance metrics to include execution of the flash application and traffic associated with the flash application by multiple instantiations of the flash application.

11. The method of claim 1, wherein generating the graphical user interface displaying the graphical representation of the generated performance metrics comprises:
   calculating an impact of the performance of the flash application, the impact triggering a contractual violation.

12. The method of claim 1, wherein generating the graphical user interface displaying the graphical representation of the generated performance metrics comprises:
   identifying the client on which a user is rendering the flash application;
   identifying specifications associated with the client; and
   calculating the performance metrics according to the client and the specifications associated with the client.

13. The method of claim 1, wherein generating the graphical user interface displaying the graphical representation of the generated performance metrics comprises:
   identifying demographics associated with a plurality of users rendering the flash application; and
   calculating the performance metrics based on the demographics.

14. A non-transitory computer readable medium encoded with computer programming logic that when executed on a process in a computerized device monitors flash performance, the medium comprising:
   instructions for embedding a tag within the markup language of a web page, the tag identifying a flash event and an associated flash event threshold to record during execution of the flash application in conjunction with rendering the web page at a client, wherein the flash event and associated flash event threshold are recorded for monitoring performance of the flash application;
   instructions for transmitting from a server the web page including the embedded tag to the client responsive to a client request for the web page;
   instructions for, in response to the flash event being recorded at the client, receiving at the server, flash event threshold information associated with the flash event;
   instructions for generating performance metrics for the flash application based on the received flash event information; and
   instructions for generating a graphical user interface displaying a graphical representation of the generated performance metrics.

15. A computerized device comprising:
   a memory;
   a processor;
   a communications interface;
   an interconnection mechanism coupling the memory, the processor and the communications interface;
   wherein the memory is encoded with a flash performance monitoring application that when executed on the processor is capable of monitoring flash performance on the computerized device by performing the operations of:
      embedding a tag within the markup language of a web page, the tag identifying a flash event and an associated flash event threshold to record during execution of the flash application in conjunction with rendering the web page at a client, wherein the flash event and associated flash event threshold are recorded for monitoring performance of the flash application;
      transmitting from a server the web page including the embedded tag to the client responsive to a client request for the web page;
      in response to the flash event being recorded at the client, receiving at the server, flash event threshold information associated with the flash event;
      generating performance metrics for the flash application based on the received flash event information; and
      generating a graphical user interface displaying a graphical representation of the generated performance metrics.

* * * * *